US007483675B2

(12) United States Patent
Kent et al.

(10) Patent No.: US 7,483,675 B2
(45) Date of Patent: Jan. 27, 2009

(54) METHOD AND SYSTEM FOR WEIGHT DETERMINATION IN A SPATIAL MULTIPLEXING MIMO SYSTEM FOR WCDMA/HSDPA

(75) Inventors: Mark Kent, Vista, CA (US); Vinko Erceg, Cardiff, CA (US); Uri M. Landau, San Diego, CA (US); Pieter Van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 609 days.

(21) Appl. No.: 11/172,759

(22) Filed: Jun. 30, 2005

(65) Prior Publication Data

US 2006/0073790 A1     Apr. 6, 2006

Related U.S. Application Data

(60) Provisional application No. 60/616,412, filed on Oct. 6, 2004.

(51) Int. Cl.
H04B 17/00     (2006.01)

(52) U.S. Cl. .................. 455/67.11; 455/562.1; 375/147; 375/347; 370/208

(58) Field of Classification Search ............... 455/67.11
See application file for complete search history.

(56) References Cited

U.S. PATENT DOCUMENTS

| | | | | |
|---|---|---|---|---|
| 6,128,276 A * | 10/2000 | Agee | ........................ | 370/208 |
| 6,359,923 B1 * | 3/2002 | Agee et al. | .................. | 375/130 |
| 6,377,636 B1 * | 4/2002 | Paulraj et al. | ............... | 375/346 |
| 6,475,245 B2 * | 11/2002 | Gersho et al. | ............... | 704/208 |
| 6,480,522 B1 * | 11/2002 | Hoole et al. | ................ | 375/130 |
| 6,621,851 B1 * | 9/2003 | Agee et al. | .................. | 375/130 |
| 6,687,492 B1 * | 2/2004 | Sugar et al. | ............... | 455/276.1 |
| 6,853,629 B2 * | 2/2005 | Alamouti et al. | ............ | 370/330 |
| 6,888,899 B2 * | 5/2005 | Raleigh et al. | .............. | 375/299 |
| 6,965,762 B2 * | 11/2005 | Sugar et al. | ............... | 455/276.1 |
| 6,970,682 B2 * | 11/2005 | Crilly et al. | ................... | 455/78 |
| 6,990,137 B2 * | 1/2006 | Smee et al. | ................. | 375/142 |
| 7,031,679 B2 * | 4/2006 | Persson et al. | ............. | 455/137 |
| 7,058,146 B2 * | 6/2006 | Paulraj et al. | ............... | 375/347 |
| 7,106,781 B2 * | 9/2006 | Agee et al. | ................... | 375/141 |
| 7,139,592 B2 * | 11/2006 | Leifer et al. | ............. | 455/562.1 |
| 7,145,971 B2 * | 12/2006 | Raleigh et al. | .............. | 375/347 |

(Continued)

OTHER PUBLICATIONS

Rousseaux et al., "A Blind Receiver For Block Transmission In A Multi-User MIMO Context With Multipath", IEEE Benelux Signal Processing Symposium, Mar. 21-22, 2002, pp. 33-36.*

(Continued)

Primary Examiner—Matthew D. Anderson
Assistant Examiner—Hai V Nguyen
(74) Attorney, Agent, or Firm—McAndrews, Held & Malloy, Ltd.

(57) ABSTRACT

Certain aspects of the method may comprise generating models for a received plurality of spatially multiplexed communication signals for multiple channels from a plurality of transmit antennas. A calculated signal to noise ratio (SNR) of each multiple channel may be maximized based on the generated models. A phase and an amplitude of at least a portion of the received plurality of spatially multiplexed communication signals may be adjusted based on a plurality of amplitude and phase correction weights determined from the maximized SNR.

20 Claims, 11 Drawing Sheets

U.S. PATENT DOCUMENTS

| | | | | |
|---|---|---|---|---|
| 7,149,238 | B2* | 12/2006 | Agee et al. | 375/141 |
| 7,194,041 | B2* | 3/2007 | Kadous | 375/267 |
| 7,197,282 | B2* | 3/2007 | Dent et al. | 455/67.14 |
| 7,245,879 | B2* | 7/2007 | Sadri et al. | 455/67.11 |
| 2002/0122465 | A1* | 9/2002 | Agee et al. | 375/141 |
| 2002/0173302 | A1* | 11/2002 | Baker et al. | 455/422 |
| 2002/0183010 | A1* | 12/2002 | Catreux et al. | 455/67.1 |
| 2003/0031234 | A1* | 2/2003 | Smee et al. | 375/147 |
| 2004/0198276 | A1* | 10/2004 | Tellado et al. | 455/132 |
| 2005/0074080 | A1* | 4/2005 | Catreux et al. | 375/347 |
| 2005/0243898 | A1 | 11/2005 | Reznik et al. | |
| 2006/0029146 | A1* | 2/2006 | Catreux et al. | 375/267 |
| 2006/0072683 | A1* | 4/2006 | Kent et al. | 375/267 |
| 2006/0105761 | A1* | 5/2006 | Walton et al. | 455/423 |
| 2006/0193373 | A1* | 8/2006 | Agee et al. | 375/141 |
| 2006/0291582 | A1* | 12/2006 | Walton et al. | 375/267 |
| 2007/0015545 | A1* | 1/2007 | Leifer et al. | 455/562.1 |
| 2007/0071013 | A1* | 3/2007 | Rooyen | 370/395.64 |
| 2008/0075033 | A1* | 3/2008 | Shattil | 370/328 |

OTHER PUBLICATIONS

Honjo et al., "Computational Complexity Reduction of MLD based on SINR in MIMO Spatial Multiplexing Systems", IEEE 2004, pp. 1426-1430.*

Jan Mietzner and Peter A. Hoeher, University of Kiel, Adaptive Antennas and MIMO Systems for Wireless Communications, Boosting the Performance of Wireless Communication Systems: Theory and Practice of Multiple-Antenna Techniques, IEEE Communications Magazine, Oct. 2004, pp. 40-47.

Simon Haykin, McMaster University; Mathini Sellathurai, Yvo De Jong, and Tricia Willink, Communications Research Centre Canada, Adaptive Antennas and MIMO Systems for Wireless Communications, Turbo-MIMO for Wireless Communications, IEEE Communications Magazine, Oct. 2004, pp. 48-53.

David J. Love, Purdue University, Robert W. Heath Jr., University of Texas at Austin and Wiroonsak Santipach and Michael L. Honig, Northwestern University; Adaptive Antennas and MIMO Systems for Wireless Communications, What is the Value of Limited Feedback for MIMO Channels?, IEEE Communications Magazine, Oct. 2004, pp. 54-59.

Quentin H. Spencer, Distribution Control Systems, Inc., Christian B. Peel, Swiss Federal Institute of Technology, A. Lee Swindlehurst, Brigham Young University, Martin Haardt, Ilmenau University of Technology, Adaptive Antennas and MIMO Systems for Wireless Communications, An Introduction to the Multi-User MIMO Downlink, IEEE Communications Magazine, Oct. 2004, pp. 60-67.

Shahab Sanayei and Aria Nosratinia, University of Texas at Dallas, Adaptive Antennas and MIMO Systems for Wireless Communications, Antenna Selection in MIMO Systems, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, Cooperative Communication in Wireless Networks, IEEE Communications Magazine, Oct. 2004, pp. 74-80.

Jack H. Winters, Member IEEE, Optimum Combining for Indoor Radio Systems with Multiple Users, IEEE Transactions on Communications, vol. Com-35, No. 11, Nov. 1987, pp. 1222-1230.

3GPP TS 25.214 V6.2.0 (Jun. 2004) Technical Specification; 3rd Generation Partnership Project: Technical Specification Group Radio Access Network: Physical Layer Procedures (FDD) (Release 6), pp. 1-64; Copyright 2004, France.

* cited by examiner

US 7,483,675 B2

METHOD AND SYSTEM FOR WEIGHT DETERMINATION IN A SPATIAL MULTIPLEXING MIMO SYSTEM FOR WCDMA/HSDPA

CROSS-REFERENCE TO RELATED APPLICATIONS/INCORPORATION BY REFERENCE

This patent application is a continuation-in-part of application Ser. No. 10/835,255 filed On Apr. 29, 2004, which makes reference to, claims priority to and claims benefit from U.S. Provisional Patent Application Ser. No. 60/467,295 filed on May 1, 2003. This patent application also makes reference to, claims priority to and claims benefit from U.S. Provisional Patent Application Ser. No. 60/616,412 filed on Oct. 6, 2004.

This application makes reference to:

U.S. patent application Ser. No. 11/173,870 filed Jun. 30, 2005;
U.S. patent application Ser. No. 11/174,303 filed Jun. 30, 2005;
U.S. patent application Ser. No. 11/173,502 filed Jun. 30, 2005;
U.S. patent application Ser. No. 11/173,871 filed Jun. 30, 2005;
U.S. patent application Ser. No. 11/173,964 filed Jun. 30, 2005;
U.S. patent application Ser. No. 11/173,252 filed Jun. 30, 2005;
U.S. patent application Ser. No. 11/174,252 filed Jun. 30, 2005;
U.S. patent application Ser. No. 11/172,756 filed Jun. 30, 2005;
U.S. patent application Ser. No. 11/173,305 filed Jun. 30, 2005;
U.S. patent application Ser. No. 11/173,689 filed Jun. 30, 2005;
U.S. patent application Ser. No. 11/173,304 filed Jun. 30, 2005;
U.S. patent application Ser. No. 11/173,129 filed Jun. 30, 2005;
U.S. patent application Ser. No. 11/172,779 filed Jun. 30, 2005;
U.S. patent application Ser. No. 11/172,702 filed Jun. 30, 2005;
U.S. patent application Ser. No. 11/173,727 filed Jun. 30, 2005;
U.S. patent application Ser. No. 11/173,726 filed Jun. 30, 2005;
U.S. patent application Ser. No. 11/172,781 filed Jun. 30, 2005;
U.S. patent application Ser. No. 11/174,067 filed Jun. 30, 2005;
U.S. patent application Ser. No. 11/173,854 filed Jun. 30, 2005;
U.S. patent application Ser. No. 11/173,911 filed Jun. 30, 2005; and
U.S. patent application Ser. No. 11/174,403 filed Jun. 30, 2005.

Each of the above referenced applications is hereby incorporated herein by reference in its entirety.

FIELD OF THE INVENTION

Certain embodiments of the invention relate to channel estimation. More specifically, certain embodiments of the invention relate to a method and system for weight determination in a spatial multiplexing multi-input multi-output (MIMO) system for WCDMA/HSDPA.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

FIG. 1A is a technology timeline indicating evolution of existing WCDMA specification to provide increased downlink throughput. Referring to FIG. 1A, there is shown data rate spaces occupied by various wireless technologies, including General Packet Radio Service (GPRS) 100, Enhanced Data rates for GSM (Global System for Mobile communications) Evolution (EDGE) 102, Universal Mobile Telecommunications System (UMTS) 104, and High Speed Downlink Packet Access (HSDPA) 106.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals may be combined in several ways, from which maximum ratio combining (MRC) is preferred in a coherent receiver. However, a RAKE receiver may be suboptimal in many practical systems, for example, its performance may degrade from multiple access interference (MAI), that is, interference induced by other users in the network.

In the case of a WCDMA downlink, MAI may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths (or RAKE fingers) after despreading, causing MAI. The level of intra-cell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to suppress interference generated within the signal reception process.

Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from increased size, complexity, and power consumption. Providing separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system weight determination in a spatial multiplexing multi-input multi-output (MIMO) system for WCDMA/HSDPA, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
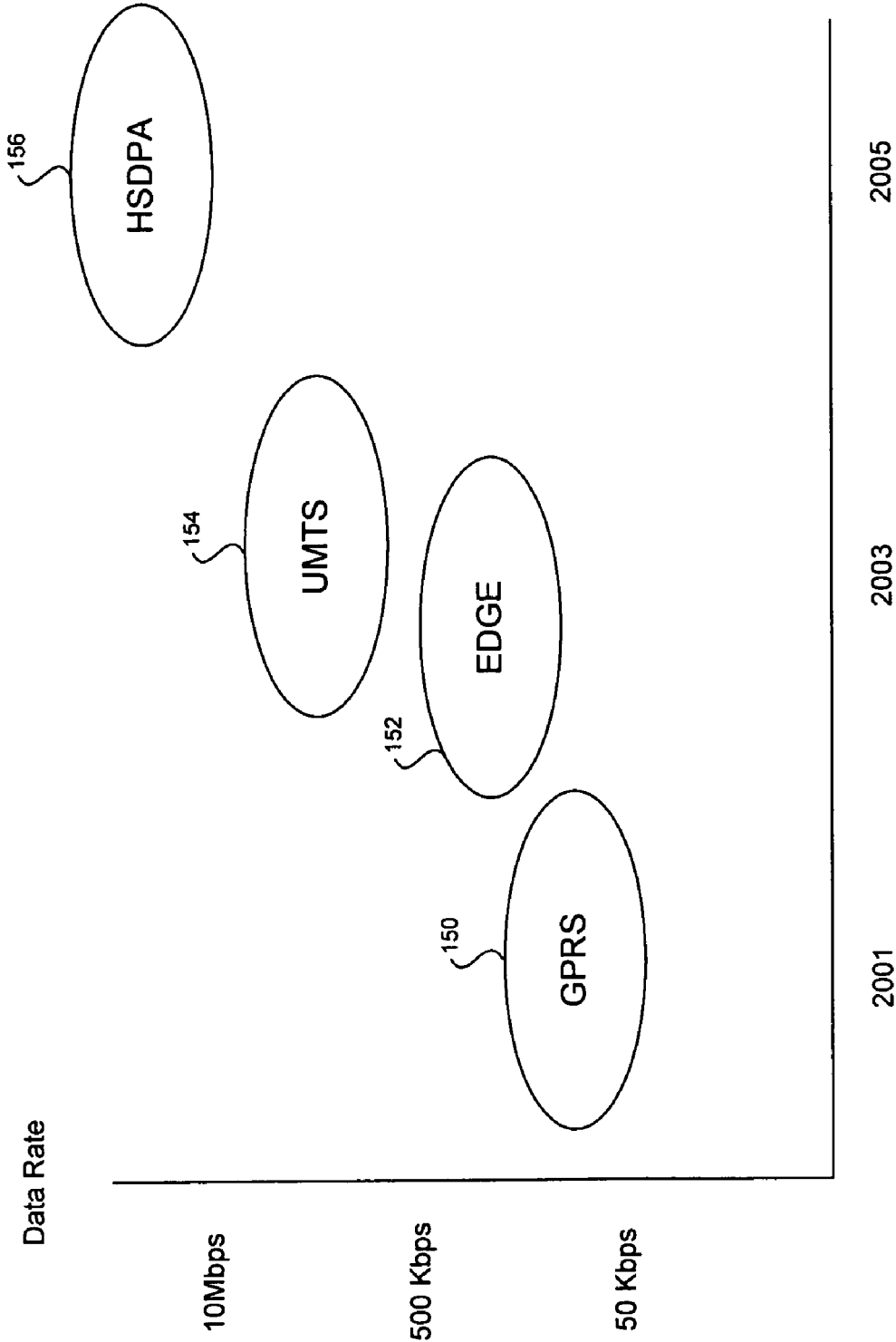
FIG. 1A is a technology timeline indicating evolution of existing WCDMA specification to provide increased downlink throughput.

Certain embodiments of the invention may be found in a method for processing signals in a communication system. Aspects of the method may comprise generating models for a received plurality of spatially multiplexed communication signals for multiple channels from a plurality of transmit antennas. A calculated signal to noise ratio (SNR) of each multiple channel may be maximized based on the generated models. A phase and an amplitude of at least a portion of the received plurality of spatially multiplexed communication signals may be adjusted based on a plurality of amplitude and phase correction weights determined from the maximized SNR.

The method may further comprise determining whether the received plurality of spatially multiplexed communication signals are noise limited. The SNR of each multiple channel may be calculated if the received plurality of spatially multiplexed communication signals are noise limited. The method may further comprise determining whether a plurality of interfering signals are present if the received plurality of spatially multiplexed communication signals are not noise limited. The signal to interference and noise ratio (SINR) of each multiple channel may be calculated if a plurality of interfering signals are not present. The SINR of each multiple channel may be calculated at a plurality of delays if a plurality of interfering signals are present. The calculated SINR of each multiple channel may be maximized based on the generated models. The plurality of amplitude and phase correction weights may be generated based on the maximized SINR. The received plurality of spatially multiplexed communication signals may be spatially demultiplexed. A plurality of vectors of baseband combined channel estimates may be generated based on phase rotation of at least a portion of the received plurality of spatially multiplexed communication signals.

Spatial multiplexing (SM) may provide a mode of signal transmission predicated upon the use of multiple antennas at both a transmitter and a receiver, for example, in such a way that the capacity of a wireless radio link may be increased without correspondingly increasing power or bandwidth consumption. In a case in which N antennas are used at both a transmitter and a receiver, an input stream of information symbols provided to the transmitter is divided into N independent substreams. In spatial multiplexing, each of these N independent substreams may occupy the same "space-time channel", for example, time slot, frequency, or code/key sequence, of the applicable multiple-access protocol. Within the transmitter, each substream may be separately applied to the N transmit antennas and propagated over an intervening multipath communication channel to a receiver. Error correction coding may be applied to each of the N streams separately or in a combined space-time methodology.

The composite multipath signals may then be received by an array of N or more receive antennas deployed at the receiver. At the receiver, a "spatial signature" defined by the N phases and N amplitudes arising at the receive antenna array for a given substream may be then estimated. Signal processing techniques may be then applied in order to spatially separate the received signals, which may allow the original substreams to be recovered and synthesized into the original input symbol stream. An overall system capacity of the order of the minimum of M and N, min(M,N), for example, may be achieved, where M may be the number of receive antennas and N may be the number of transmit antennas for flat fading channel conditions. The principles of spatially multiplexed communication and exemplary system implementations are further described in, for example, "Optimum combining for indoor radio systems with multiple users", by J. H. Winters, IEEE Transactions on Communications, Vol. COM-35, No. 11, November 1987, which is hereby incorporated by reference in its entirety.

Figure 1B:
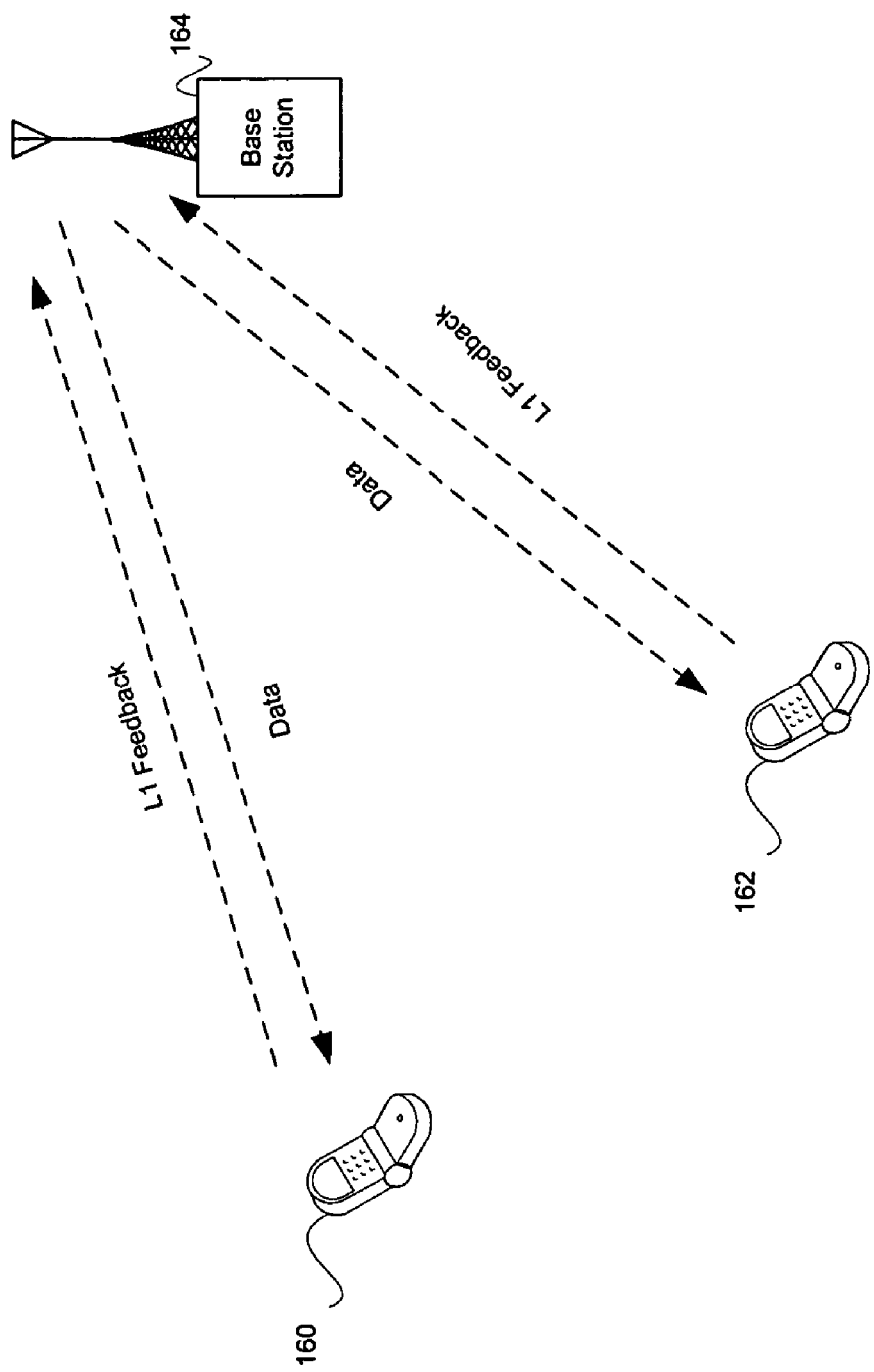
FIG. 1B illustrates an exemplary HSDPA distributed architecture that achieves low delay link adaptation, in connection with an embodiment of the invention.

FIG. 1B illustrates an exemplary HSDPA distributed architecture that achieves low delay link adaptation, in connection with an embodiment of the invention. Referring to FIG. 1B, there is shown terminals 110 and 112 and a base station (BS) 114. HSDPA is built on a distributed architecture that achieves low delay link adaptation by placing key processing at the BS 114 and thus closer to the air interface as illustrated. Accordingly, the MAC layer at the BS 114 is moved from Layer 2 to Layer 1, which implies that the systems may respond in a much faster manner with data access. Fast link adaptation methods, which are generally well established within existing GSM/EDGE standards, include fast physical layer (L1) retransmission combining and link adaptation techniques. These techniques may deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control may not reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1C:
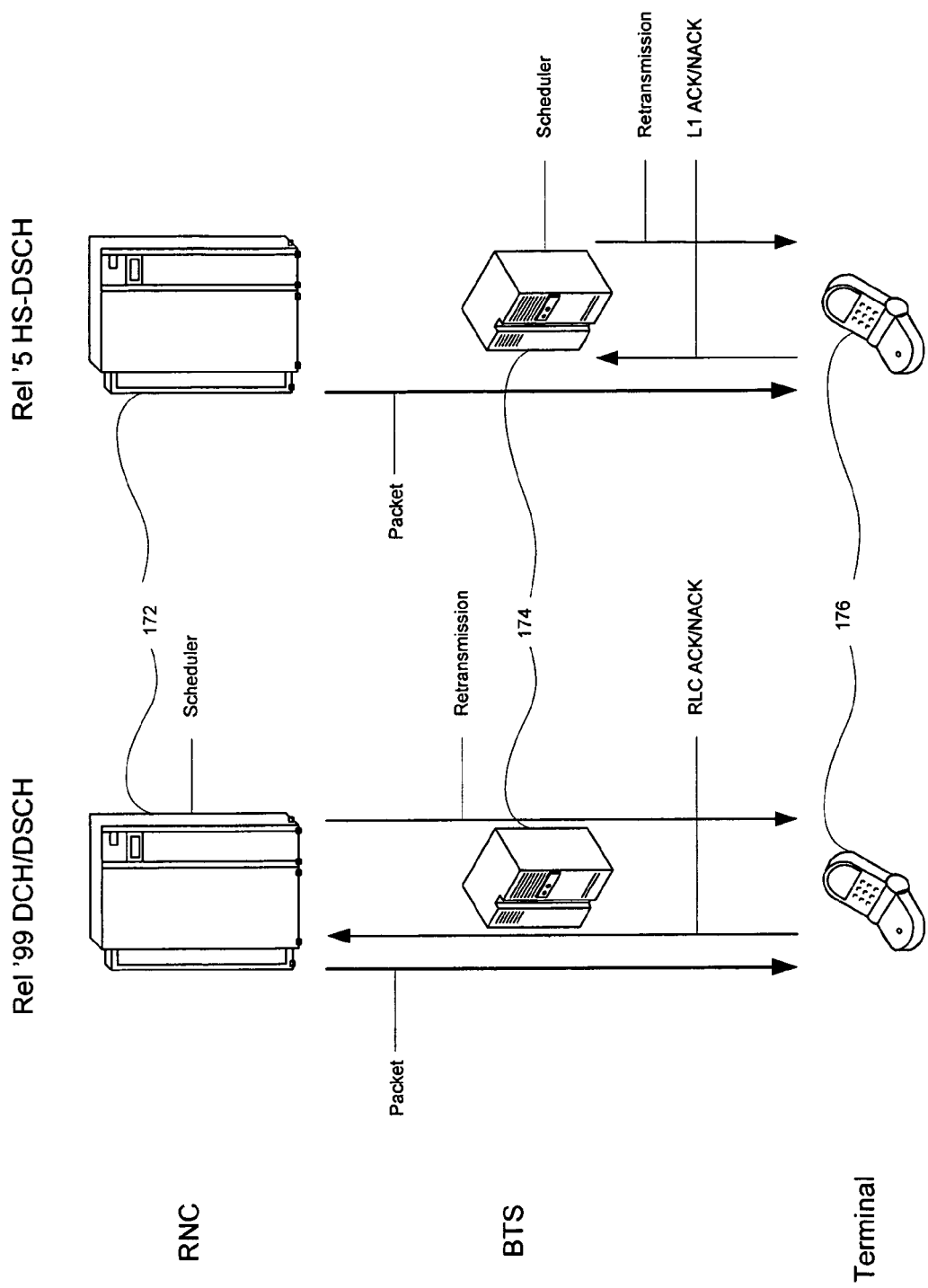
FIG. 1C illustrates an exemplary Layer 1 HARQ control situated in a base station to remove retransmission-related scheduling and storing from the radio network controller, in connection with an embodiment of the invention.

FIG. 1C illustrates an exemplary Layer 1 HARQ control situated in a base station to remove retransmission-related scheduling and storing from the radio network controller, in connection with an embodiment of the invention. Referring to FIG. 1C, there is shown a hybrid automatic repeat request (HARQ) operation, which is an operation designed to reduce the delay and increase the efficiency of retransmissions. Layer 1 HARQ control is situated in the Node B, or base station (BS) 174, thus removing retransmission-related scheduling and storing from the radio network controller RNC 172. This HARQ approach avoids hub delay and measurably reduces the resulting retransmission delay.

For example, when a link error occurs, due to signal interference or other causes, a mobile terminal 176 may request the retransmission of the data packets. While current-generation WCDMA networks handle those retransmission requests through the radio network controller 172, HSDPA retransmission requests are managed at the base station 174. Using this approach, packets are combined at the physical (PHY) layer and the mobile terminal 176 stores the received data packets in soft memory. If decoding has failed, the new transmission is combined with the old transmission before channel decoding. The HSDPA approach allows previously transmitted bits from the original transmission to be combined with the retransmission. This combining strategy provides improved decoding efficiencies and diversity gains while minimizing the need for additional repeat requests. The combining may include different puncturing pattern therefore providing code and time diversity.

While the spreading factor may be fixed, the coding rate may vary between ¼ and ¾, and the HSDPA specification supports the use of 5, 10 or 15 multicodes, for example. More robust coding, fast HARQ, and multi-code operation eliminates the need for variable spreading factor and also allows for more advanced receiver structures in the mobile such as equalizers as apposed to the traditional RAKE receiver used in most CDMA systems. This approach may also allow users having good signal quality or higher coding rates and those at the more distant edge of the cell having lower coding rates to each receive an optimum available data rate.

By moving data traffic scheduling to the base station 174, and thus closer to the air interface, and by using information about channel quality, terminal capabilities, QoS, and power/code availability, HSDPA may achieve more efficient scheduling of data packet transmissions. Moving these intelligent network operations to the base station 174 allows the system to take full advantage of short-term variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 174, HSDPA gathers and utilizes estimates of the channel quality of each active user. This feedback provides current information on a wide range of channel physical layer conditions, including power control, ACK/NACK ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2 ms frame length, compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may supports 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) may carry ARQ acknowledgements, downlink quality feedback and other necessary control information on the uplink.

Figure 1D:
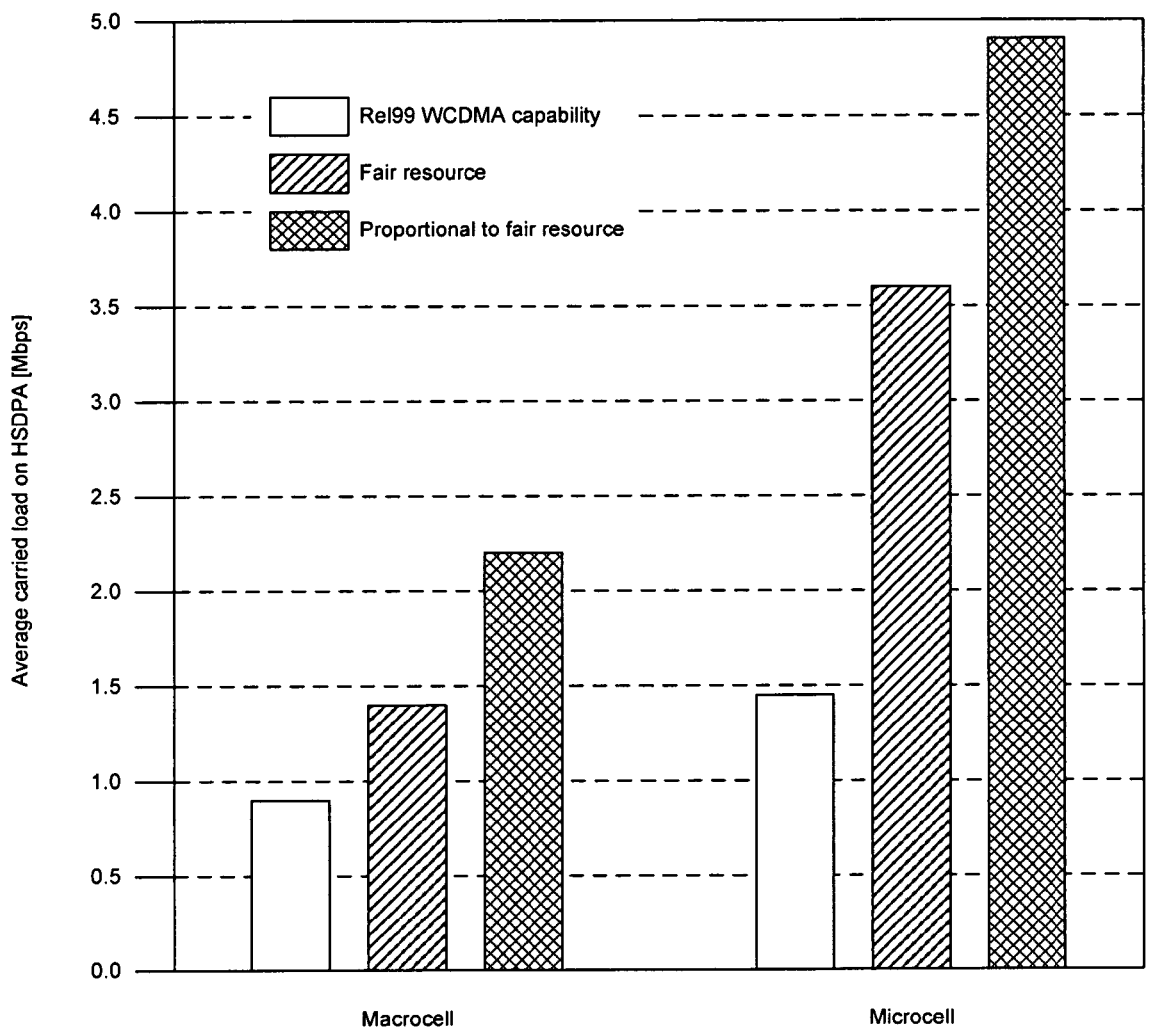
FIG. 1D is a chart illustrating exemplary average carried loads for HSDPA-based macrocell and microcell systems, in connection with an embodiment of the invention.

FIG. 1D is a chart illustrating exemplary average carried loads for HSDPA-based macrocell and microcell systems, in connection with an embodiment of the invention. Referring to FIG. 1D, in practical deployments, HSDPA more than doubles the achievable peak user bit rates compared to WCDMA Release 99. With bit rates that are comparable to DSL modem rates, HS-DSCH may deliver user bit rates in large macrocell environments exceeding 1 Mbit/s, and rates in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bit/s/Hz/cell.

Figure 1E:
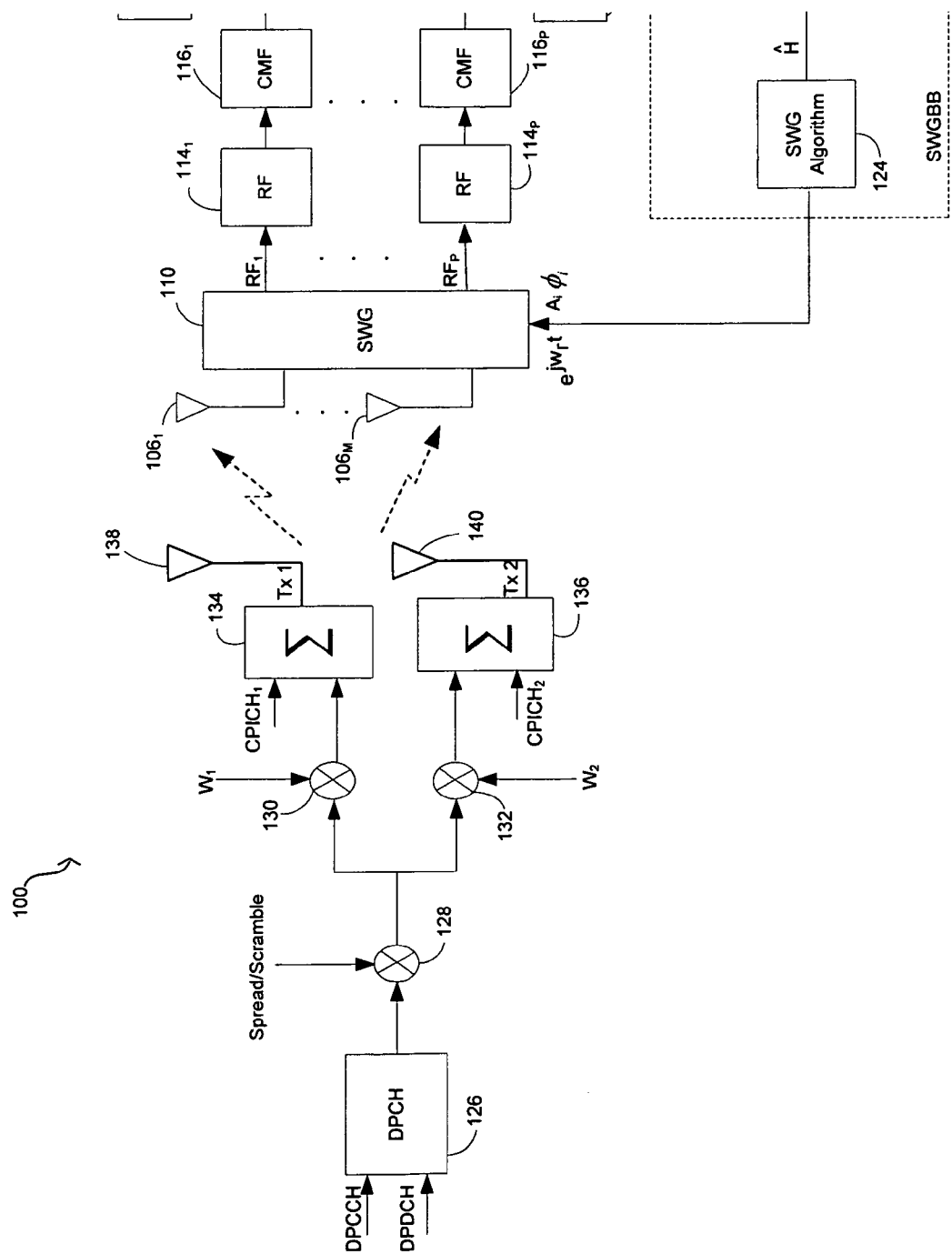
FIG. 1E is a block diagram of exemplary 2 Tx antenna and M Rx antenna spatially multiplexed wireless communication system with multiple RF chains and receiver channel estimation, in accordance with an embodiment of the invention.

FIG. 1E is a block diagram of exemplary 2 Tx antenna and M Rx antenna spatially multiplexed wireless communication system with receiver channel estimation, in accordance with an embodiment of the invention. Referring to FIG. 1E, the wireless system 100 may comprise a dedicated physical channel (DPCH) block 126, a plurality of mixers 128, 130 and 132, a plurality of combiners 134 and 136, a first transmit antenna (Tx 1) 138 and an additional transmit antenna (Tx 2) 140 on the transmit side. On the receive side, the wireless system 100 may comprise a plurality of receive antennas $106_{1 \ldots M}$, a single weight generator (SWG) 110, a plurality of RF blocks $114_{1 \ldots P}$, a plurality of chip matched filters (CMF) $116_{1 \ldots P}$, a spatially multiplexed baseband (SMBB) processor 126 and a single weight generator baseband processor (SWGBB) 121. The SWGBB 121 may comprise a channel estimator 122 and a single weight generator (SWG) algorithm block 124.

The DPCH 126 may be adapted to receive a plurality of input channels, for example, a dedicated physical control channel (DPCCH) and a dedicated physical data channel (DPDCH). The DPCH 126 may simultaneously control the power of DPCCH and DPDCH. The mixer 128 may be adapted to mix the output of DPCH 126 with a spread and/or scrambled signal to generate a spread complex valued signal that may be input to mixers 130 and 132. The mixers 130 and 132 may weight the complex valued input signals with weight factors $W_1$ and $W_2$, respectively, and may generate outputs to a plurality of combiners 134 and 136 respectively. The combiners 134 and 136 may combine the outputs generated by mixers 130 and 132 with common pilot channel 1 (CPICH1) and common pilot channel 2 (CPICH2) respectively. The common pilot channels 1 and 2 may have a fixed channelization code allocation that may be utilized to measure the phase amplitude signal strength of the channels. The weights $W_1$ and $W_2$ may be utilized, for example, phase and or amplitude adjustments and may be generated by the single weight generator (SWG) algorithm block 124. The antennas 138 and 140 may receive the generated outputs from the combiners 134 and 136 and may transmit wireless signals.

The plurality of receive antennas $106_{1 \ldots M}$ may each receive at least a portion of the transmitted signal. The SWG 110 may comprise suitable logic, circuitry, and/or code that may be adapted to determine a plurality of weights to be applied to each of the input signals $R_{1 \ldots M}$. The SWG 110 may be adapted to modify the phase and amplitude of a portion of the transmitted signals received by the plurality of receive antennas $106_{1 \ldots M}$ and generate a plurality of output signals $RF_{1 \ldots P}$.

The plurality of RF blocks $114_{1 \ldots P}$ may comprise suitable logic, circuitry, and/or code that may be adapted to process an RF signal. The RF blocks $114_{1 \ldots P}$ may perform, for example, filtering, amplification, and analog-to-digital (A/D) conversion operations. The plurality of transmit antennas 138 and 140 may transmit the processed RF signals to a plurality of receive antennas $106_{1 \ldots M}$. The single weight generator SWG 110 may comprise suitable logic, circuitry, and/or code that may be adapted to determine a plurality of weights, which may be applied to each of the input signals. The single weight generator SWG 110 may be adapted to modify the phase and amplitude of at least a portion of the signals received by the plurality of receive antennas $106_{1 \ldots M}$ and generate a plurality of output signals $RF_{1 \ldots P}$. The plurality of RF receive blocks $114_{1 \ldots P}$ may comprise suitable logic, circuitry and/or code that may be adapted to amplify and convert the received analog RF signals $RF_{1 \ldots P}$ down to baseband. The plurality of RF receive blocks $114_{1 \ldots P}$ may each comprise an analog-to-digital (A/D) converter that may be utilized to digitize the received analog baseband signal.

The plurality of chip matched filters (CMF) $116_{1 \ldots P}$ may comprise suitable logic, circuitry and/or code that may be adapted to filter the output of the plurality of RF receive blocks $114_{1 \ldots P}$ so as to produce in-phase (I) and quadrature (Q) components (I, Q). In this regard, in an embodiment of the invention, the plurality of chip matched filters (CMF) $116_{1 \ldots P}$ may comprise a pair of digital filters that are adapted to filter the I and Q components to within the bandwidth of WCDMA baseband (3.84 MHz). The outputs of the plurality of chip matched filters (CMF) $116_{1 \ldots P}$ may be transferred to the SMBB processor 126.

The SMBB 126 may be adapted to receive a plurality of in-phase and quadrature components (I, Q) from a plurality of chip matched filters (CMF) $116_{1 \ldots P}$ and generate a plurality of baseband combined channel estimates $\hat{h}_1$ to $\hat{h}_P$. The SMBB 126 may be adapted to generate a plurality of estimates $\hat{X}_1$ to $\hat{X}_P$ of the original input spatial multiplexing sub-stream signals or symbols $X_1$ to $X_P$. The SMBB 126 may be adapted to separate the different space-time channels utilizing a Bell Labs Layered Space-Time (BLAST) algorithm, for example, by performing sub-stream detection and sub-stream cancellation. The transmission capacity may be increased almost linearly by utilizing the BLAST algorithm.

The channel estimator 122 may comprise suitable logic, circuitry, and/or code that may be adapted to process the received estimates $\hat{h}_1$ to $\hat{h}_P$ from the SMBB processor 126 and may generate a matrix $\hat{H}$ of processed estimated channels that may be utilized by the single weight generator (SWG) algorithm block 124.

The SWG algorithm block 124 may determine a plurality of amplitude and phase values $A_i$ and $\phi_i$, respectively, which may be utilized by SWG 110 to modify the phase and amplitude of a portion of the transmitted signals received by the plurality of receive antennas $106_{1...M}$ and generate a plurality of output signals $RF_{1...P}$.

Figure 2:
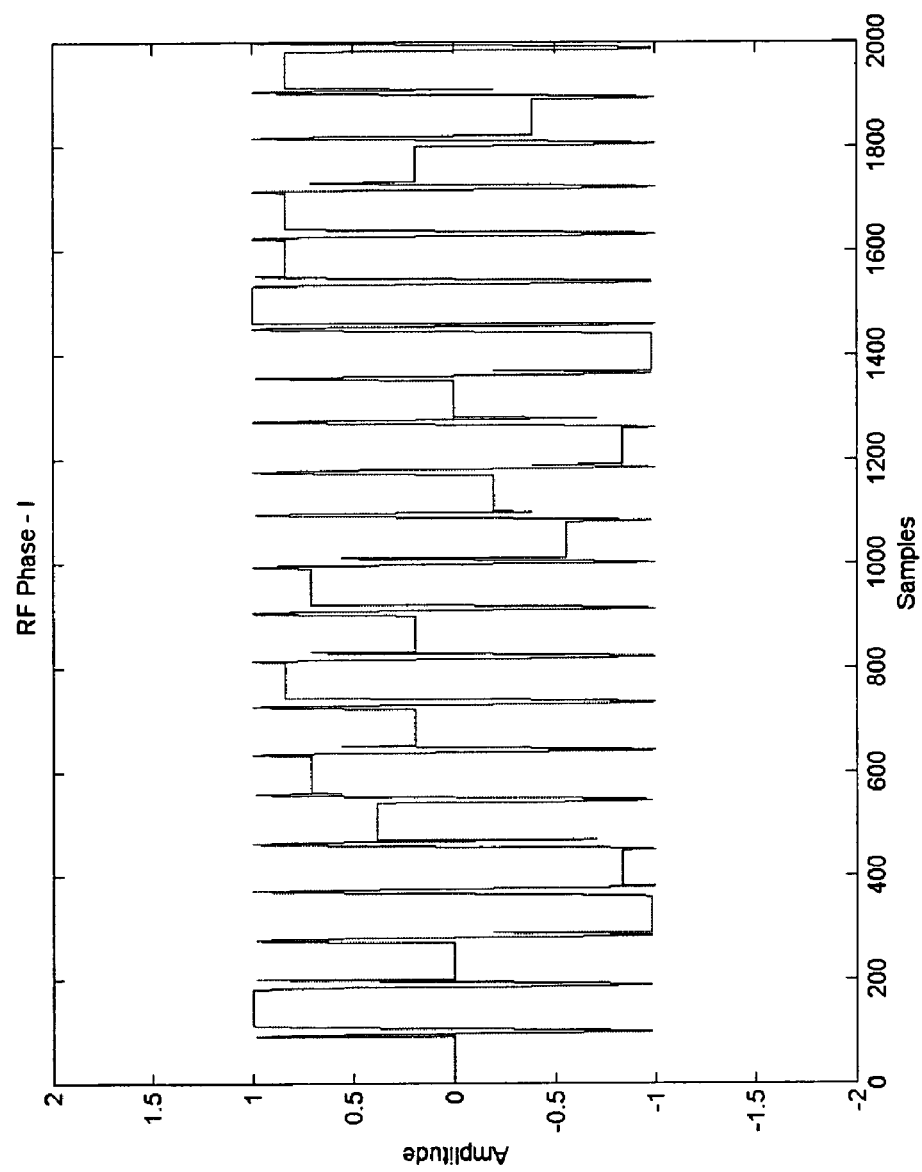
FIG. 2 illustrates an exemplary periodic phase rotation for an I signal component, in accordance with an embodiment of the invention.

FIG. 2 illustrates an exemplary periodic phase rotation for an I signal component, in accordance with an embodiment of the invention. Referring to FIG. 2, for the wireless system 200 in FIG. 1, by rotating the phase at the receive antennas $206_{1...M}$ from 0 to 360 degrees, it may be possible to estimate all propagation channels, $h_{1...M}$, at the same time utilizing complex multiplication and integration. This operation is equivalent to making all the channels at the Rx antennas orthogonal. FIG. 2 illustrates the periodic rotation of the I component in an RF signal.

Figure 3A:
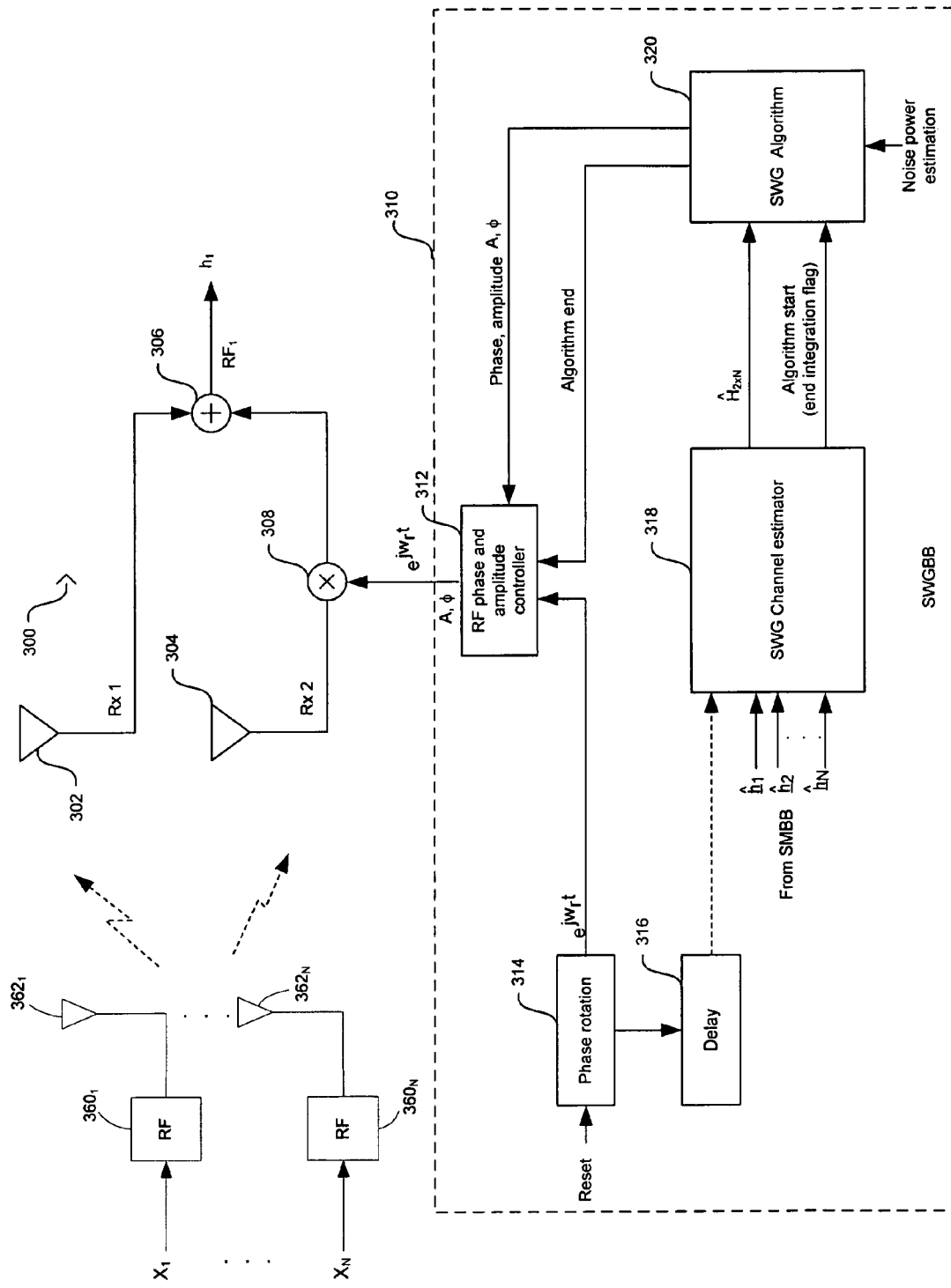
FIG. 3A is a block diagram of an exemplary system for providing phase rotation, channel estimation and for determining optimal phase and amplitude parameters or settings for an additional receive antenna, in accordance with an embodiment of the invention.

FIG. 3A is a block diagram of an exemplary system for providing phase rotation, channel estimation and for determining optimal phase and amplitude parameters or settings for an additional receive antenna, in accordance with an embodiment of the invention. Referring to FIG. 3A, a receiver system 300 may comprise a first receive antenna Rx 1 302, an additional antenna Rx 2 304, a combiner 306, a complex multiplier 308, and a single weight generator baseband (SWGBB) processor 310. The SWGBB processor 310 may comprise a phase rotation start controller block 314, a delay block 316, a SWG channel estimator 318, a single weight generator (SWG) algorithm block 320, and a RF phase and amplitude controller 312. The SWGBB processor 310 provides similar functionality as the SMBB processor 126 in FIG. 1.

The receive antennas Rx 1 302 and Rx 2 304 may each receive a portion of the transmitted signal. The combiner 306 may be adapted to combine the received signals into a single RF signal $RF_1$, for example. The complex multiplier 308 may be adapted to receive a plurality of input signals from the additional receive antenna Rx 2 304 and the RF phase and amplitude controller 312 and may generate an output signal to the combiner 306.

The phase rotation start controller block 314 may comprise suitable logic, circuitry and/or that may be adapted to start after receiving a reset signal and may generate a plurality of output signals to the delay block 316 and the RF phase and amplitude controller 312. The delay block 316 may be adapted to receive an input signal from the phase rotation start controller block 314 and generate a delayed output signal to the SWG channel estimator 318. The SWG channel estimator 318 may comprise suitable logic, circuitry, and/or code that may be adapted to process the received baseband combined channel estimates per transmit antenna $\hat{h}_1 \ldots \hat{h}_N$ from the SMBB processor 126 and may generate a matrix $\hat{H}_{2 \times N}$ of processed estimated channels. The SWG channel estimator 318 may be adapted to generate an algorithm start signal indicating the end of integration that may be utilized by the single weight generator (SWG) algorithm block 320.

The SWG algorithm block 320 may be adapted to receive a plurality of signals from the SWG channel estimator 318, for example, a matrix $\hat{H}_{2 \times N}$ of processed baseband combined channel estimates, an algorithm start signal from the SWG channel estimator 318 and a noise power estimation signal. The SWG algorithm block 320 may generate phase and amplitude correction signals and an algorithm end signal to the RF phase and amplitude controller 312. The RF phase and amplitude controller 312 may be adapted to receive the phase and amplitude values and the algorithm end signal to modify the phase and amplitude of a portion of the transmitted signals received by the receive antenna Rx 2 302 and generate an output signal $RF_1$.

The SWG channel estimator 318 may receive baseband combined channel estimates $\hat{h}_1 \ldots \hat{h}_N$, which may include all transmission channels from N Tx antennas and each Tx antenna may have a different channel estimation sequence, so that the different combined channels $\hat{h}_1 \ldots \hat{h}_N$ may be separated and estimated. The SWG channel estimator 318 may generate a matrix of channel estimates $\hat{H}_{2 \times N}$ to the SWG algorithm block 320. A reset signal may be utilized to start the phase rotation block 314. The combined channel estimates from the SMBB 126 in FIG. 1 may be transferred to the channel estimator 318 for processing. When processing is complete, the SWG channel estimator 318 may indicate to the SWG algorithm block 320 that the determination of the appropriate phase and amplitude correction for the portion of the received signal in the additional antenna Rx 2 304 may start. The SWG algorithm block 320 may utilize an estimation of the noise power and interference in determining the phase and amplitude values in addition to the matrix of channel estimates $\hat{H}_{2 \times N}$. The SWG algorithm block 320 may indicate to the RF phase and amplitude controller 312 the end of the weight determination operation and may then transfer to the RF phase and amplitude controller 312, the determined phase and amplitude values. The RF phase and amplitude controller 312 may then modify the portion of the received signal in the additional antenna Rx 2 304 via the complex multiplier 308.

In operation, the RF phase and amplitude controller 312 may apply the signal $e^{jwt}r'$ to the mixer 308 in FIG. 3A based on control information provided by the phase rotator start controller 314. The switch 340 may select the rotation waveform source 342 based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection of the switch 340. In this regard, the switch 340 may be utilized to select and apply the signal $Ae^{j\phi}$ to the mixer 308 in FIG. 3A.

Figure 3B:
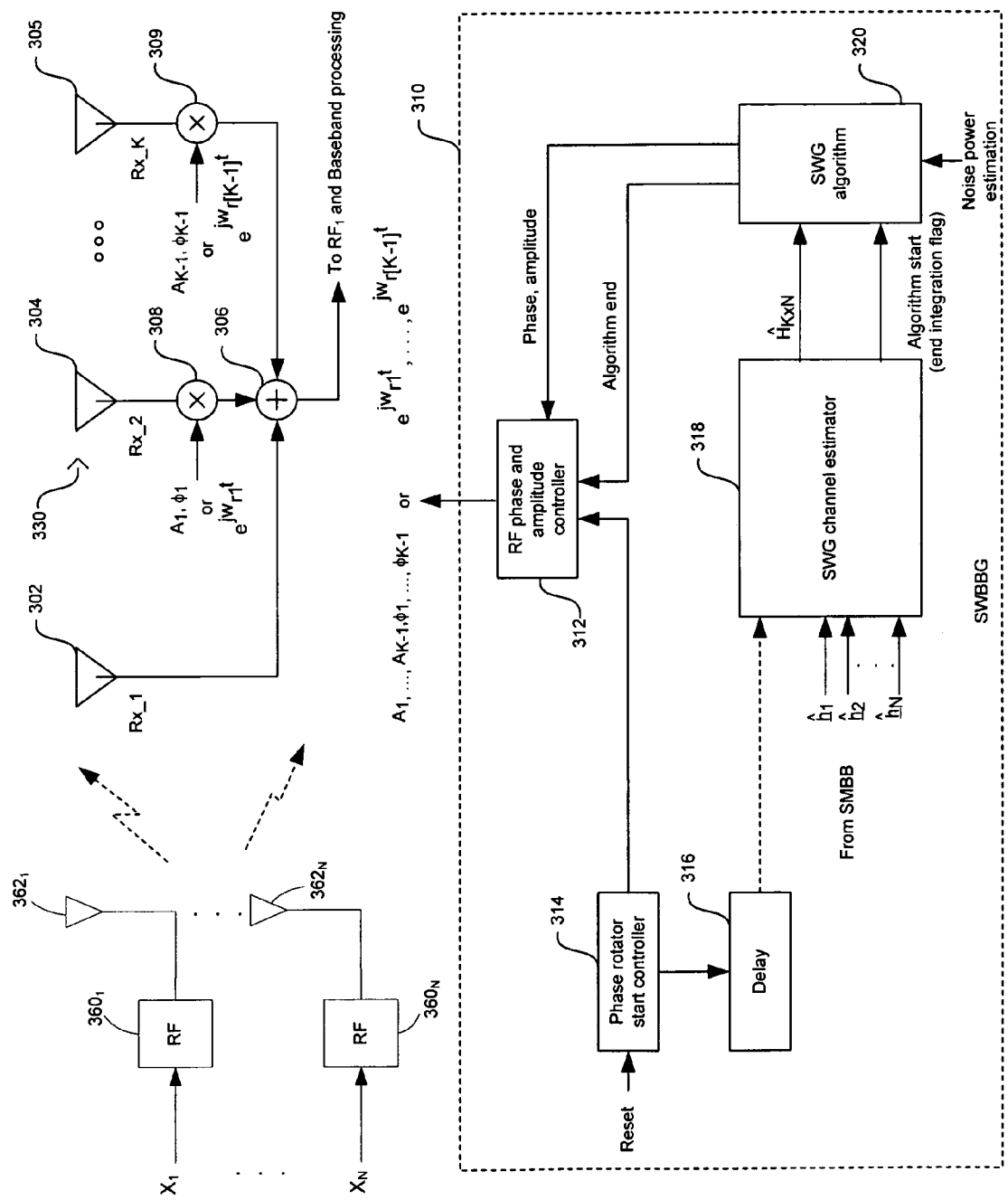
FIG. 3B is a block diagram of an exemplary system for providing phase rotation, channel estimation and for determining optimal phase and amplitude parameters or setting for additional K-1 receive antennas, in accordance with an embodiment of the invention.

FIG. 3B is a block diagram of an exemplary system for providing phase rotation, channel estimation and for determining optimal phase and amplitude parameters or setting for additional K-1 receive antennas, in accordance with an embodiment of the invention. Referring to FIG. 3B, a receiver system 330 may correspond to a portion of the wireless communication system 100 in FIG. 1 and may differ from the receiver system 300 in FIG. 3A in that (K-1) additional receive antennas, Rx_2 304 to Rx_K 305, and (K-1) mixers 308 to 309 may be utilized. The combiner 306 may combine the received signals into a single RF signal $RF_1$, for example. In this regard, the SWG channel estimator 318 may be adapted to process the combined channel estimates, $\hat{h}_1 \ldots \hat{h}_N$, and determine the propagation channel matrix estimate $\hat{H}_{K \times N}$.

Referring to the FIG. 1, multiple receive antennas may be connected to each of the RF chains $RF_1 \ldots RF_N$ as shown in FIG. 3B for the single RF chain $RF_1$. In this regard, the combined channel estimates $\hat{h}_1 \ldots \hat{h}_N$ and consequently the channel estimate matrix $\hat{H}_{K \times N}$ may be determined per each RF chain $RF_1 \ldots RF_N$. Consequently, following this example, N matrices $\hat{H}_{K \times N}$ may form a channel estimate matrix $\hat{H}_{M \times N}$ in FIG. 1 (M=NK).

The SWG algorithm block 320 may also be adapted to determine (K-1) channel weights per RF chain, that may be utilized to maximize receiver SINR, for example, to be applied to the mixers 308 to 309 to modify the portions of the transmitted single channel communication signals received by the additional receive antennas Rx_2 304 to Rx_K 305. The (K-1) channel weights per RF chain may comprise amplitude and phase components, $A_1$ to $A_{K-1}$ and $\phi_1$ to $\phi_{K-1}$. The RF phase and amplitude controller 312 may also be adapted to apply rotation waveforms $e^{jw_{r1}t}$ to $e^{jw_{r(K-1)}t}$ or phase and amplitude components, $A_1$ to $A_{K-1}$ and $\phi_1$ to $\phi_{K-1}$, to the mixers 308 to 309. In this regard, the RF phase and amplitude controller 312 may apply the rotation waveforms or the amplitude and phase components in accordance with the control signals provided by the phase rotator start controller 314 and/or the algorithm end signal generated by the SWG algorithm block 320.

Figure 3C:
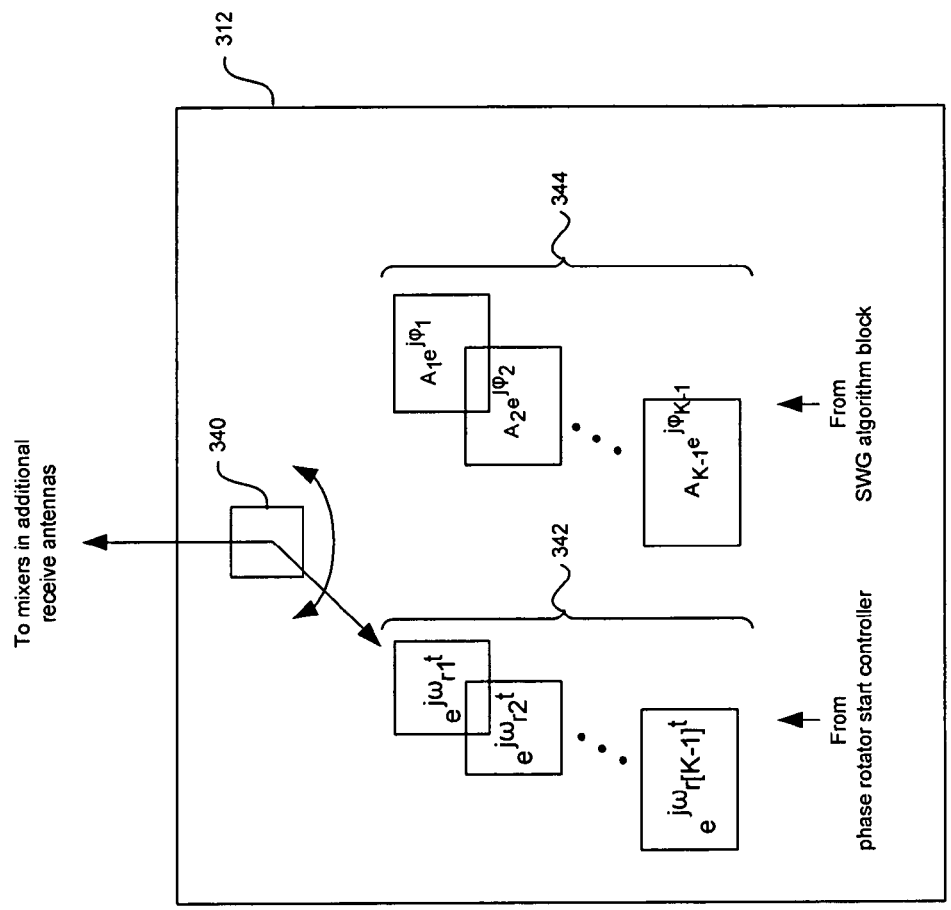
FIG. 3C is a block diagram of an exemplary RF phase and amplitude controller, in accordance with an embodiment of the invention.

FIG. 3C is a block diagram of an exemplary RF phase and amplitude controller, in accordance with an embodiment of the invention. Referring to FIG. 3C, the RF phase and amplitude controller 312 may comprise a switch 340, rotation waveform sources 342, and a plurality of SWG algorithm determined weights 344. The switch 340 may comprise suitable hardware, logic, and/or circuitry that may be adapted to select between the rotation waveforms $e^{jw_{r1}t}$ to $e^{jw_{r(K-1)}t}$ and the SWG algorithm determined weights $A_1 e^{j\Phi_1}$ to $A_{K-1} e^{j\Phi_{K-1}}$. The rotation waveform source 342 may comprise suitable hardware, logic and/or circuitry that may be adapted to generate the signal $e^{jw_{rk}t}$, where $w_{rk}=2\pi f_{rk}$ and $f_{rk}$ is the rotation frequency that preserves orthogonality of the received signals at the multiple receiving antennas. The rotation frequency that preserves the signal orthogonality at the receiving antennas may be selected as $w_{rk}=kw_r$ where k=1, 2, 3 . . . K-1. Other rotation waveforms such as triangular or square may be utilized with the same frequency relationships. In addition, waveforms representing different orthogonal codes of the same frequency may be utilized, similar to the CDMA orthogonal codes with the same spreading. In this embodiment $e^{jw_{rk}t}$ is used as an exemplary waveform. The weights 344 may comprise suitable hardware, logic, and/or circuitry that may be adapted to generate the signals $A_1 e^{j\Phi_1}$ to $A_{K-1} e^{j\Phi_{K-1}}$ from the amplitude and phase components, $A_1$ to $A_{K-1}$ and $\phi_1$ to $\phi_{K-1}$, respectively.

In operation, the RF phase and amplitude controller 312 may apply the signals $e^{jw_{r1}t}$ to $e^{jw_{r(K-1)}t}$ to the mixers 308 to 309 in FIG. 3B based on control information provided by the phase rotator start controller 314. The switch 340 may select the rotation waveform source 342 based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection of the switch 340. In this regard, the switch 340 may be utilized to select and apply the signals $A_1 e^{j\Phi_1}$ to $A_{K-1} e^{j\Phi_{M-1}}$ to the mixers 308 to 309 in FIG. 3B.

Figure 4:
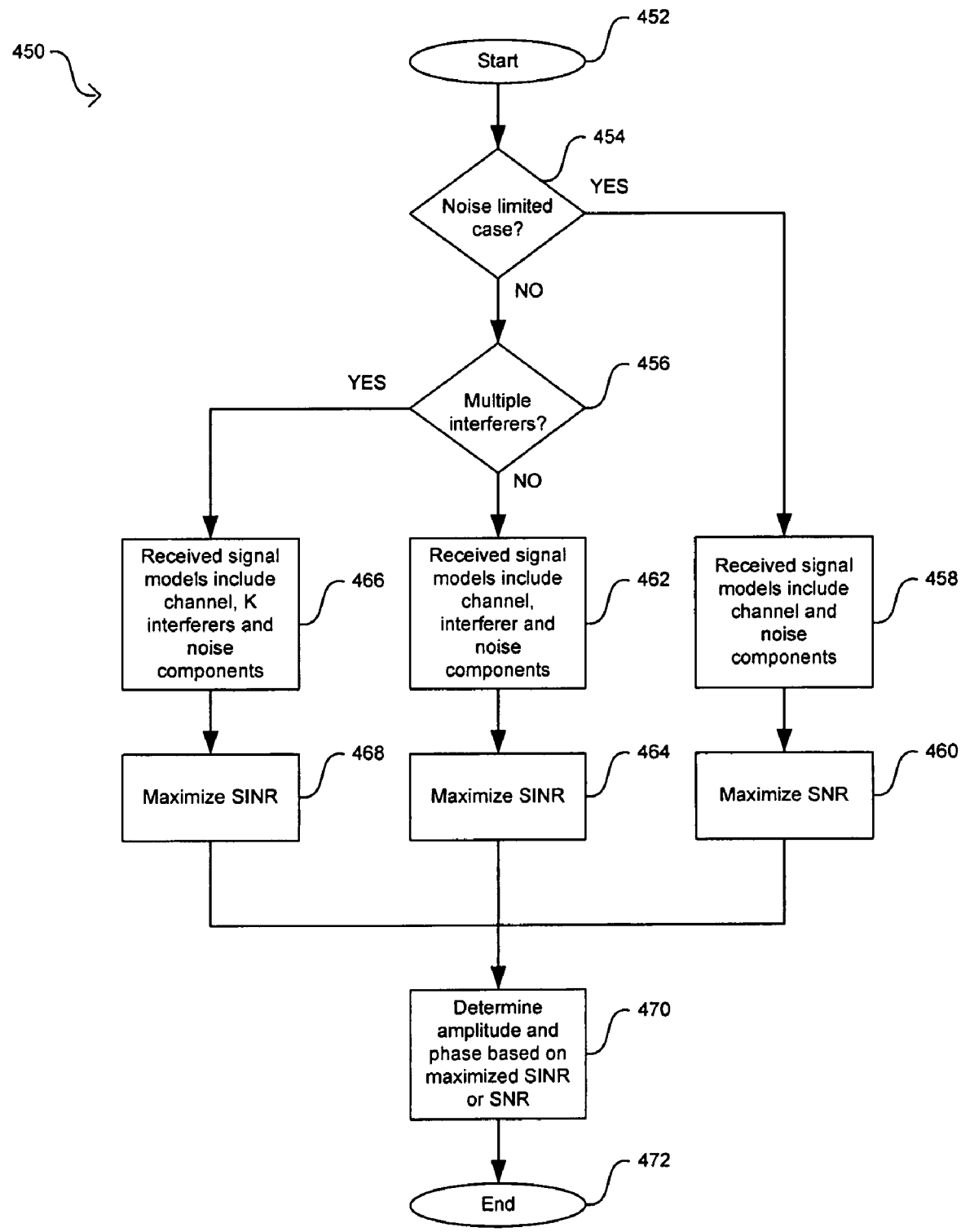
FIG. 4 is a flow diagram illustrating exemplary steps for determining channel weight utilizing SINR or SNR in an additional receive antenna, in accordance with an embodiment of the invention.

FIG. 4 is a flow diagram illustrating exemplary steps for determining channel weights in additional receive antennas utilizing signal-to-noise ratio (SNR) or signal-to-interference-and-noise ratio (SINR), in accordance with an embodiment of the invention. Referring to FIG. 4, after start step 452, in step 454, the SWG algorithm block 320 may determine whether the signals received in the receive antennas are noise limited. The SWG algorithm block 320 may receive noise statistics and/or other noise information from either the CPP $516_{1 \ldots P}$ (FIG. 5) and/or from the spatial multiplexing processor 518. When the received signals are noise limited, the flow diagram control may proceed to step 458. In step 458, the SWG algorithm block 320 may generate models for the received signals. For example, the models for a 1-Tx and 2-Rx antennas system may be represented by the following expressions:

$$r_1 = h_1 s + n_1,$$

$$r_2 = A e^{j\Theta} h_2 s + A e^{j\Theta} n_2, \text{ and}$$

$$y = r_1 + r_2 = s(h_1 + A e^{j\Theta} h_2) + n_1 + A e^{j\Theta} n_2,$$

where $r_1$ may represent a model of the signal received in a first receive antenna, $r_2$ may represent a model of the signal received in the second receive antenna, s may represent the transmitted signal, and $n_1$ may represent a noise component at the first receive antenna, whose time varying impulse response is represented by $h_1$. The parameter $n_2$ may represent a noise component at the second receive antenna, whose time varying impulse response is represented by $h_2$, $\Theta$ may represent the phase factor between the signal received in the first and second receive antennas, and A may represent an amplitude factor. The parameter y may represent the sum of the received signal models and may comprise a combined signal component $s(h_1 + A e^{j\Theta} h_2)$ and a combined noise component $n_1 + A e^{j\Theta} n_2$.

For the case of a MIMO system with N-transmit and M-receive antennas, the models may be represented by the expressions:

$$r_k = \sum_{i=1}^{N} (A_k e^{j\theta} k h_{ik} s + A_k e^{j\theta} k n_k),$$

$$y = \sum_{k=1}^{M} (r_k),$$

where $r_k$ may represent the model of the signal received from the N transmit antennas by the $k^{th}$ receive antenna, $h_{ik}$ may represent the time varying impulse response of the propagation channel between the $i^{th}$ transmit antenna and the $k^{th}$ receive antenna, and s may represent the transmitted signal, $n_k$ may represent a noise component at the $k^{th}$ receive antenna. The parameter $A_k$ may correspond to the amplitude factor associated with the $k^{th}$ receive antenna, $\Theta_k$ may correspond to the phase factor associated with the $k^{th}$ receive antenna, and y may represent the sum of the M received signal models. In this regard, $A_k(k=1)=1$ and $\Theta_k(k=1)=0$.

In step 460, the received signal models may be utilized to determine a signal strength parameter. In this regard, the signal-to-noise ratio (SNR) may correspond to the signal strength parameter to be determined. For example, for a 1-Tx and 2-Rx antennas system, the SNR may be determined by maximizing the following expression for various phase, $\Theta$, and amplitude, A, factors:

$$SNR = \frac{\|h_1 + Ae^{j\vartheta}h_2\|^2}{E\|n_1\|^2 + E\|Ae^{j\vartheta}n_2\|^2} = \frac{\|h_1 + Ae^{j\vartheta}h_2\|^2}{\sigma^2(1+A^2)}.$$

The SNR numerator may correspond to the y parameter's combined signal component while the SNR denominator may correspond to the y parameter's combined noise component. The phase factor, $\Theta$, may be selected, for example, from a 360-degrees phase rotation while the amplitude factor, A, may be selected, for example, from an set amplitude range. In one embodiment of the invention, the phase factor may be varied in a plurality of phase factor steps over the 360-degrees phase rotation to find the maximum SNR value. In another embodiment of the invention, the phase factor may be varied in a plurality of phase factors steps over the 360-degrees phase rotation and the amplitude factor may be varied in a plurality of amplitude factor values over the amplitude range to find the maximum SNR value.

In step 470, after determining the maximum SNR in step 460, the SWG algorithm block 320 may utilize the amplitude factor and phase factor that corresponds to the maximum SNR to determine the amplitude and phase to be provided to the RF amplitude and phase controller 312 in step 470. For example, in one embodiment of the invention, the amplitude and/or phase factors that correspond to the maximum SNR may be utilized as the amplitude and phase to be transferred to the RF amplitude and phase controller 312. After application of the appropriate amplitude and phase by the RF amplitude and phase controller 312 to the receive antennas, the flow diagram control may proceed to end step 472 until a next phase and amplitude determination is necessary.

Returning to step 454, when received signals are not noise limited, the flow control may proceed to step 456 where a determination may be made as to whether multiple interfering signals may be present and may need to be considered during channel weight determination. When a single interferer is considered, the flow diagram control may proceed to step 462. In step 462 the SWG algorithm block 320 may generate models for the received signals. For example, the models for a 1-Tx and 2-Rx antennas system may be represented by the following expressions:

$r_1 = h_1 s + h_{I1} s_I + n_1$, $r_2 = Ae^{j\Theta}(h_2 s + h_{I2} s_I + n_2)$, and $y = r_1 + r_2 = s(h_1 + Ae^{j\Theta}h_2) + n_1 + s_I(h_{I1} + Ae^{j\Theta}h_{I2}) + Ae^{j\Theta}n_2$, where $r_1$ may represent a model of the signal received in a first receive antenna, $r_2$ may represent a model of the signal received in the second receive antenna, s may represent the transmitted signal, $S_I$ may represent the interference signal, and $n_1$ may represent a noise component at the first receive antenna whose time varying impulse response is $h_1$. The parameter $n_2$ may represent a noise component at the second receive antenna whose time varying impulse response is $h_2$, $\Theta$ may represent the phase factor between the signal received in the first and second receive antennas, and A may represent an amplitude factor. Moreover, the time varying impulse response $h_{I1}$ may correspond to the propagation channel between the interference signal source and the first receive antenna and the time varying impulse response $h_{I2}$ may correspond to the propagation channel between the interference signal source and the second receive antenna. The parameter y may represent the sum of the received signal models and may comprise a combined signal component $s(h_1+Ae^{j\Theta}h_2)$ and a combined noise plus interference component $n_1+s_I(h_{I1}+Ae^{j\Theta}h_{I2})+Ae^{j\Theta}n_2$.

For the case of a MIMO system with N-transmit and M-receive antennas, the models may be represented by the expressions:

$$r_k = \sum_{i=1}^{N} (A_k e^{j\vartheta} k h_{ik} s + A_k e^{j\vartheta} k h_{ik} s_I + A_k e^{j\vartheta} k n_k),$$

$$y = \sum_{k=1}^{M} (r_k),$$

where $r_k$ may represent the model of the signal received from the N transmit antennas by the $k^{th}$ receive antenna, $h_{ik}$ may represent the propagation channel between the $i^{th}$ transmit antenna and the $k^{th}$ receive antenna, s may represent the transmitted signal, $s_I$ may represent the interference signal, $n_k$ may represent a noise component at the $k^{th}$ receive antenna, $h_{Ik}$ may represent the time varying impulse response of propagation channel between the interference source and the $k^{th}$ receive antenna. The parameter $A_k$ may correspond to the amplitude factor associated with the $k^{th}$ receive antenna, $\Theta_k$ may correspond to the phase factor associated with the $k^{th}$ receive antenna, and y may represent the sum of the M received signal models. In this regard, $A_k(k=1)=1$ and $\Theta_k(k=1)=0$.

In step 464, the received signal models may be utilized to determine a signal strength parameter. In this regard, the signal-to-interference-and-noise ratio (SINR) may correspond to the signal strength parameter to be determined. For example, for a 1-Tx and 2-Rx antennas system, the SINR may be determined by maximizing the following expression for various phase, $\Theta$, and amplitude, A, factors:

$$SINR = \frac{\|h_1 + Ae^{j\vartheta}h_2\|^2}{E\|n_1\|^2 + E\|Ae^{j\vartheta}n_2\|^2 + \|h_{I1} + Ae^{j\vartheta}h_{I2}\|^2} = \frac{\|h_1 + Ae^{j\vartheta}h_2\|^2}{\sigma^2(1+A^2) + \|h_{I1} + Ae^{j\vartheta}h_{I2}\|^2}.$$

where $\sigma^2$ is the noise power. The above SINR equations may be easily extended, by one skilled in art, to the single channel MIMO case.

The transmit antennas may include CL1 or CL2 transmit diversity weights. The joint transmit-received solution may be formed in that case that may include the transmit CL weights and the additional transmit antenna channel components in the SINR numerator. The SINR numerator may correspond to the y parameter's combined signal component while the SINR denominator may correspond to the y parameter's combined noise plus interference component. The phase factor, □, may be selected, for example, from a 360-degrees phase rotation while the amplitude factor, A, may be selected, for example, from an set amplitude range. In one embodiment of the invention, the phase factor may be varied in a plurality of phase factor steps over the 360-degrees phase rotation to find the maximum SNR value. In another embodiment of the invention, the phase factor may be varied in a plurality of phase factors steps over the 360-degrees phase rotation and the amplitude factor may be varied in a plurality of amplitude factor values over a range of amplitudes to find the maximum SINR value.

After determining the SINR in step 464, the SWG algorithm block 320 may determine the amplitude and phase to be provided to the RF amplitude and phase controller 312 in step 470. After application of the appropriate amplitude and phase by the RF amplitude and phase controller 312, the flow diagram control may proceed to end step 472 until a next phase and amplitude determination is necessary.

Returning to step 456, when multiple taps or multiple paths in the channel impulse response may need to be considered, the flow diagram control may proceed to step 466. In step 466, the SWG algorithm block 320 may generate the received signal models for cases in which multiple taps or interference sources are considered. In step 468, the SWG algorithm block 320 may utilize the received signal models to determine the SINR for multiple interferers. When the desired signal has $i=1, \ldots, P$ taps or multiple paths with different delays and the interfering signal has $k=1, \ldots, R$ taps or multiple paths with different delays, then the maximum SINR solution for the 1-Tx and 2-Rx antenna system in that case may be as follows:

$$SINR_{max} = \frac{\sum_{i=1}^{P} \|h_1 + Ae^{j\vartheta}h_2\|^2}{\sigma^2(1+A^2) + \sum_{k=1}^{R} \|h_{I1} + Ae^{j\vartheta}h_{I2}\|^2}.$$

The $SINR_{max}$ expression may be extended to the single channel MIMO case with or without CL transmit antenna weights.

After determining the SINR in step 468, the SWG algorithm block 320 may determine the amplitude and phase to be provided to the RF amplitude and phase controller 312 in step 470. After application of the appropriate amplitude and phase by the RF amplitude and phase controller 312, the flow diagram control may proceed to end step 472 until a next phase and amplitude determination is necessary.

The operations to maximize the signal strength described for steps 460, 464, and 468 may be based on a search algorithm. In an exemplary embodiment of the invention, a search algorithm may be utilized to search over 360-degrees phase rotation in 45-degree or 90-degree phase factor steps and over a 0-5 amplitude range in 0.25 amplitude values or steps, for example. For a 1-Tx and 2-Rx antenna system, with 90-degree phase factor steps, a phase only search algorithm may calculate 4 SNR or SINR values, for example. For a 2-Tx and 2-Rx antenna system with STTD transmit mode, with 90-degree phase factor steps, a phase only search algorithm may calculate 4 SNR or SINR values. For a 2-Tx and 2-Rx antenna system with the CL1 diversity mode, with 90-degree phase factor steps at both receiver and transmitter, a phase only search algorithm may calculate 4×4=16 SNR or SINR values. For a 2-Tx and 2-Rx antenna system with the CL2 diversity mode, with 90-degree phase factor steps at the receiver and 45-degree phase factor steps and two power scaling weight levels at the transmitter, a phase only search algorithm may calculate 4×8×2=64 SNR or SINR values, for example. The maximum value generated by the algorithm may be the output of the search algorithm.

In another embodiment of the invention, a closed-form mathematical expression may also be utilized to maximize the SNR and/or the SINR. Utilizing an algorithm or closed-form expression that maximizes the SINR or SNR may provide a good compromise between implementation complexity and performance gains. Notwithstanding, the invention is not limited in this regard, and other channel weight algorithms may also be utilized.

Figure 5:
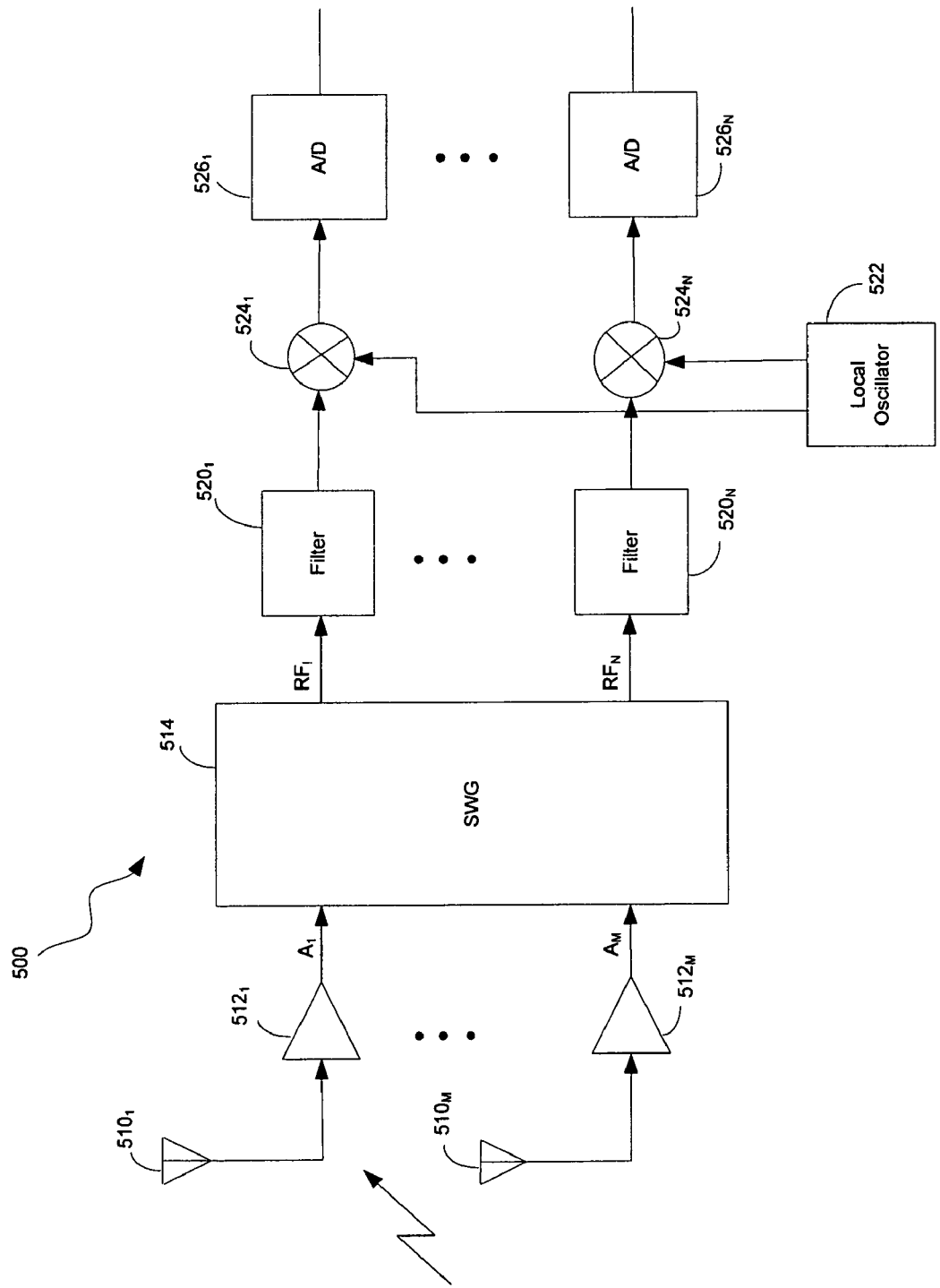
FIG. 5 is a block diagram of an exemplary receiver illustrating spatial multiplexing in a MIMO communication system that may be utilized in connection with an embodiment of the invention.

FIG. 5 is a block diagram of an exemplary receiver illustrating spatial multiplexing in a MIMO communication system that may be utilized in connection with an embodiment of the invention. Referring to FIG. 5, there is shown a receiver 500 that comprises a plurality of receive antennas $510_{1,2,\ldots,M}$, a plurality of amplifiers $512_{1,2,\ldots,M}$, a SWG block 514, a plurality of filters $520_{1,2,\ldots,N}$, a local oscillator 522, a plurality of mixers $524_{1,2,\ldots,N}$, a plurality of analog to digital (A/D) converters $526_{1,2,\ldots,N}$ and a spatial multiplexing baseband processor SMBB 530.

The antennas $510_{1,2,\ldots,M}$ may be adapted to receive the transmitted signals. The amplifiers $512_{1,2,\ldots,M}$ may be adapted to amplify the M received input signals. The SWG block 514 may comprise a plurality of amplitude and phase shifters to compensate for the phase difference between various received input signals. Weights may be applied to each of the input signals $A_{1\ldots M}$ to modify the phase and amplitude of a portion of the transmitted signals received by the plurality of receive antennas $512_{1\ldots M}$ and generate a plurality of output signals $RF_{1\ldots N}$. The plurality of filters $520_{1,2,\ldots,N}$ may be adapted to filter frequency components of the RF substreams. The mixers $524_{1,2,\ldots,N}$ may be adapted to downconvert the analog RF substreams to baseband. The local oscillator 522 may be adapted to provide a signal to the mixers $524_{1,2,\ldots,N}$, which is utilized to downconvert the analog RF substreams to baseband. The analog to digital (A/D) converters $526_{1,2,\ldots,N}$ may be adapted to convert the analog baseband substreams into their corresponding digital substreams. The spatial multiplexing baseband processor SMBB 530 may be adapted to process the digital baseband substreams and multiplex the plurality of digital signals to generate output signals or symbols $\hat{X}_1 \ldots \hat{X}_N$ which may be estimates of the original spatial multiplexing sub-stream signals or symbols $X_1 \ldots X_N$.

In operation, the MT RF signals transmitted by a plurality of transmitters may be received by a plurality of M receive antennas $510_{1,2,\ldots,M}$ deployed at the receiver 500. Each of the M received signals may be amplified by a respective low noise amplifier $512_{1,2,\ldots,M}$. A plurality of weights may be applied to each of the input signals $A_{1\ldots M}$ to modify the phase and amplitude of a portion of the transmitted signals received by the plurality of receive antennas $512_{1\ldots M}$. A plurality of output signals $RF_{1\ldots N}$ may be generated, which may be filtered by a plurality of filters $520_{1,2,\ldots,N}$. The resulting N filtered signals may then be downconverted to baseband utilizing a plurality of N mixers $524_{1,2,\ldots,N}$, each of which may be provided with a carrier signal that may be generated by a local oscillator 522. The N baseband signals generated by the mixers $524_{1,2,\ldots,N}$ may then be converted to digital signals by a plurality of analog to digital (A/D) converters $526_{1,2,\ldots,N}$. The N digital signals may further be processed by a spatial multiplexing baseband processor SMBB 530 to generate an output signals $\hat{X}_1 \ldots \hat{X}_N$, which are estimates of the original spatial multiplexing sub-stream signals or symbols $X_1 \ldots X_N$.

Another embodiment of the invention may provide a machine-readable storage, having stored thereon, a computer program having at least one code section executable by a machine, thereby causing the machine to perform the steps as described above for weight determination in a spatial multiplexing multi-input multi-output (MIMO) system for WCDMA/HSDPA.

In another embodiment of the invention a system for processing signals in a communication system may be provided. With reference to FIG. 1E, a plurality of receive antennas $108_{1\ldots M}$ may be adapted to receive a plurality of spatially multiplexed communication signals from a plurality of transmit antennas $106_{1\ldots N}$. A processor, for example, the SWGBB processor 121 may be adapted to generate models for the received plurality of spatially multiplexed communication signals. The SWGBB processor 121 may comprise suitable logic, circuitry and/or code that may be adapted to calculate the signal to noise ratio (SNR) of each multiple channel $X_1$ to $X_P$. The SWGBB processor 121 may be adapted to maximize the calculated SNR of each multiple channel based on the generated models. The SNR may be determined by maximizing the expression in equation (1).

The SWGBB processor 121 may generate a plurality of amplitude and phase correction weights $A_i$ and $\phi_i$ based on the maximized calculated SNR. The SWGBB processor 121 may be adapted to adjust a phase and an amplitude of at least a portion of the received plurality of spatially multiplexed communication signals based on the generated plurality of amplitude and phase correction weights $A_i$ and $\phi_i$, respectively.

The SWGBB processor 121 may further determine whether the received plurality of spatially multiplexed communication signals are noise limited. The SWGBB processor 121 may be adapted to calculate the signal to interference and noise ratio (SINR) of each multiple channel based on determining whether a plurality of interfering signals are present. When a single interferer may need to be considered, the models may be represented by, $r_1$, $r_2$ and y.

In these expressions, $r_1$ may represent the model for the signal received in Rx 1 108$_1$, $r_2$ may represent the model for the signal received in Rx 2 108$_2$, s may represent the transmitted signal, $n_1$ may represent a noise component of channel $h_1$, $n_2$ may represent a noise component of channel $h_2$, $h_{I1}$ may represent the interference on channel $h_1$, $h_{I2}$ may represent the interference on channel $h_2$, and $\Theta$ may represent the phase difference between the signal received in Rx 1 108$_1$ and the signal received in Rx 2 108$_2$. Similarly, the model may be extended to $r_M$, for example, where $r_M$ may represent the model for the signal received in Rx M 108$_M$, $n_M$ may represent a noise component of channel $h_M$, $h_{IM}$ may represent the interference on channel $h_M$ and M may represent the number of RF paths.

The SWGBB processor 121 may be adapted to maximize the calculated SINR of each multiple channel based on the generated models. When a single interferer is considered, the SINR may be determined by maximizing the following expression utilizing equation (2). When the desired signal has i=1 ... N taps at different delays and interfering signal has k=1 ... M taps at different delays, then the maximum SINR solution in that case may be calculated by utilizing equation (3).

The SWGBB processor 121 may generate the plurality of amplitude and phase correction weights $A_i$ and $\phi_i$ based on the maximized calculated SINR. The plurality of receive antennas 108$_{1...M}$ may receive the plurality of spatially multiplexed communication signals that may comprise code division multiplexed communication signals. The baseband processor SMBB 118 may be adapted to spatially demultiplex the received plurality of spatially multiplexed communication signals. A plurality of cluster path processors 116$_{1...P}$ may generate a plurality of vectors of baseband combined channel estimates $\hat{h}_1$ to $\hat{h}_P$ based on phase rotation in response to receiving the plurality of spatially multiplexed communication signals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
   generating models for a received plurality of spatially multiplexed communication signals for multiple channels from a plurality of transmit antennas;
   maximizing a calculated signal to noise ratio (SNR) of each of said multiple channels based on said generated models; and
   adjusting a phase and an amplitude of at least a portion of said received plurality of spatially multiplexed communication signals based on a generated plurality of amplitude and phase correction weights determined from said maximizing.

2. The method according to claim 1, comprising determining whether said received plurality of spatially multiplexed communication signals are noise limited.

3. The method according to claim 1, comprising calculating said SNR of each of said multiple channels if said received plurality of spatially multiplexed communication signals are noise limited.

4. The method according to claim 1, comprising determining whether a plurality of interfering signals are present if said received plurality of spatially multiplexed communication signals are not noise limited.

5. The method according to claim 4, comprising calculating signal to interference and noise ratio (SINR) of each of said multiple channels if a plurality of interfering signals are not present.

6. The method according to claim 5, comprising calculating said SINR of each of said multiple channels at a plurality of delays if a plurality of interfering signals are present.

7. The method according to claim 6, comprising maximizing said calculated SINR of each of said multiple channels based on said generated models.

8. The method according to claim 7, comprising generating said plurality of amplitude and phase correction weights based on said maximizing.

9. The method according to claim 1, comprising spatially demultiplexing said received plurality of spatially multiplexed communication signals.

10. The method according to claim 1, comprising generating a plurality of vectors of baseband combined channel estimates based on phase rotation in response to said receiving of said plurality of spatially multiplexed communication signals.

11. A system for processing signals in a communication system, the system comprising:
   one or more circuits that enables generation of models for a received plurality of spatially multiplexed communication signals for multiple channels from a plurality of transmit antennas;
   said one or more circuits enables maximization of a calculated signal to noise ratio (SNR) of each of said multiple channels based on said generated models; and
   said one or more circuits enables adjustment of a phase and an amplitude of at least a portion of said received plurality of spatially multiplexed communication signals based on a generated plurality of amplitude and phase correction weights determined from said maximizing.

12. The system according to claim 11, wherein said one or more circuits enables determining whether said received plurality of spatially multiplexed communication signals are noise limited.

13. The system according to claim 11, wherein said one or more circuits enables calculation of said SNR of each of said multiple channels if said received plurality of spatially multiplexed communication signals are noise limited.

14. The system according to claim 11, wherein said one or more circuits enables determining whether a plurality of interfering signals are present if said received plurality of spatially multiplexed communication signals are not noise limited.

15. The system according to claim 14, wherein said one or more circuits enables calculation of signal to interference and noise ratio (SINR) of each of said multiple channels if a plurality of interfering signals are not present.

16. The system according to claim 15, wherein said one or more circuits enables calculation of said SINR of each of said multiple channels at a plurality of delays if a plurality of interfering signals are present.

17. The system according to claim 16, wherein said one or more circuits enables maximization of said calculated SINR of each of said multiple channels based on said generated models.

18. The system according to claim 17, wherein said one or more circuits enables generation of said plurality of amplitude and phase correction weights based on said maximizing.

19. The system according to claim 11, wherein said one or more circuits enables spatial demultiplexing of said received plurality of spatially multiplexed communication signals.

20. The system according to claim 11, wherein said one or more circuits enables generation of a plurality of vectors of baseband combined channel estimates based on phase rotation in response to said receiving of said plurality of spatially multiplexed communication signals.

* * * * *